United States Patent [19]

Sotelo et al.

[11] Patent Number: 4,666,191
[45] Date of Patent: May 19, 1987

[54] HIGH PRESSURE HOSE AND COUPLING

[75] Inventors: Albert M. Sotelo, Littleton; Ron D. Trujillo, Englewood, both of Colo.

[73] Assignee: The Gates Rubber Company, Denver, Colo.

[21] Appl. No.: 791,499

[22] Filed: Oct. 25, 1985

[51] Int. Cl.⁴ .............................................. F16L 39/02
[52] U.S. Cl. .................... 285/149; 285/297; 138/103; 138/109; 138/DIG. 3
[58] Field of Search ................ 285/149, 297; 138/103, 138/109, DIG. 3

[56] References Cited

U.S. PATENT DOCUMENTS

| 2,473,441 | 6/1949 | Muller | 285/149 |
|---|---|---|---|
| 2,853,319 | 9/1958 | Press | 285/149 X |
| 3,166,688 | 1/1965 | Rowand et al. | 138/103 X |
| 4,143,892 | 3/1979 | Murphy et al. | 285/149 |
| 4,353,581 | 10/1982 | Eisenzimmer | 285/149 |
| 4,569,541 | 2/1986 | Eisenzimmer | 285/149 |

FOREIGN PATENT DOCUMENTS

| 2260357 | 6/1973 | Fed. Rep. of Germany | 285/149 |
|---|---|---|---|
| 913421 | 12/1962 | United Kingdom | 285/149 |
| 1434120 | 5/1976 | United Kingdom | 285/149 |

Primary Examiner—Thomas F. Callaghan
Attorney, Agent, or Firm—C. H. Castleman, Jr.; H. W. Oberg, Jr.; F. P. Grassler

[57] ABSTRACT

A reinforced hose and coupling assembly is disclosed that will withstand very high pressures without bursting. A modified seal ring eliminates shear planes in the wire reinforcement near the fitting end of the coupling and thereby reduces the possibility of failure of the hose coupling at high pressure. The assembly also incorporates the use of a fluoroelastomeric tube liner and fluoroelastomeric seals to prevent the permeation of $H_2S$ gas into the anchoring matrix.

29 Claims, 3 Drawing Figures

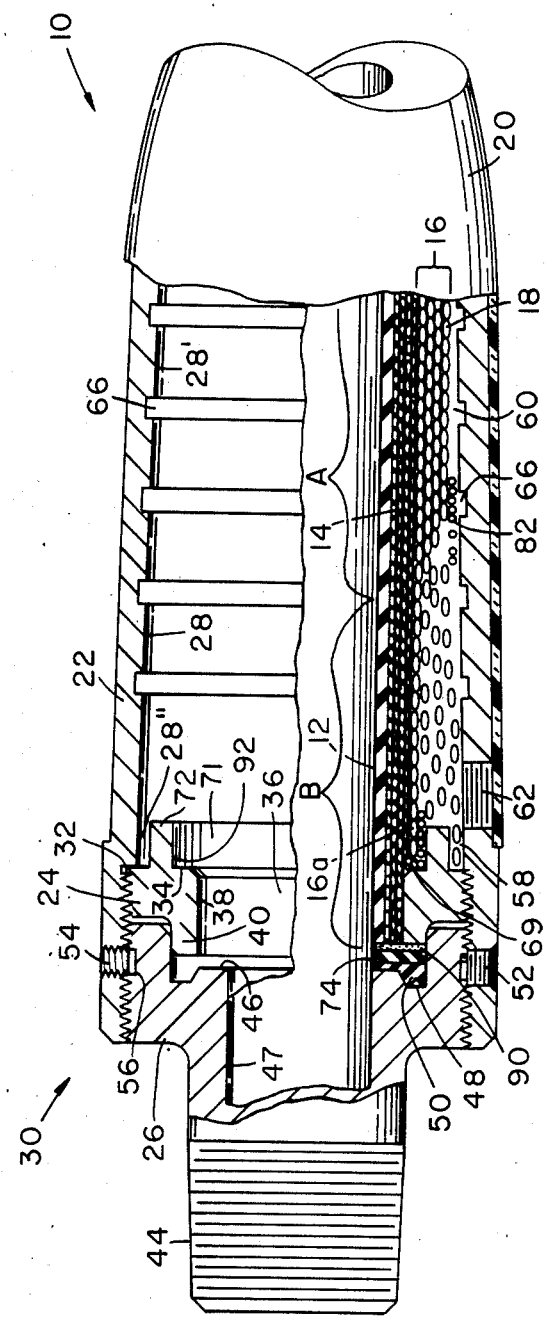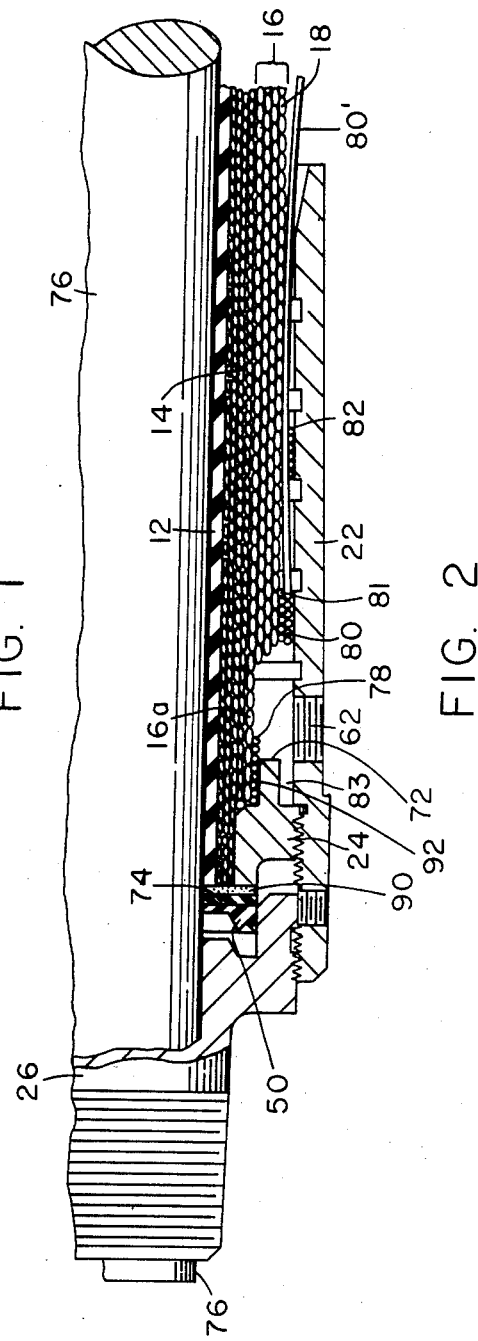
FIG. 1
FIG. 2

HIGH PRESSURE HOSE AND COUPLING

BACKGROUND OF THE INVENTION

This invention relates to reinforced hose, couplings and assemblies, more particularly to improvements that increase the performance and durability of the hose and coupling assembly.

In the design of coupling assemblies for fairly heavy duty hose, for example rotary drill, choke and kill and motion compensator hose, two important criteria are reduction in length and weight of the coupling without compromising working and burst pressure capability, and end seal reliability. One approach that has been taken, as disclosed in U.S. Pat. No. 4,143,892 to Murphy et al, is to taper the coupling sleeve into a frustro-conical shape with an enlarged end adjacent the nipple of the coupling. At the base of this frustrum, the pitch of certain of the wire reinforcements has been increased in stepped fashion with the individual wires of increased pitch being longitudinally and/or radially nonuniformly spaced apart, and then embedded in an anchoring matrix of polymeric resin. However, certain gases, particularly $H_2S$, can permeate the seal and tube material and destroy the reinforcement anchoring matrix in the coupling, so that the wires can move as the hose is pressurized. The tube material also prevents $H_2S$ permeation into the hose body. If the wires deform at high pressure, the burst resistance is lowered and the hose does not perform optimally. By using a fluoroelastomeric material for the seal and tube liner of the coupling, $H_2S$ in up to 20% concentrations is not able to permeate into the body of the hose and the wire will remain firmly anchored.

Another objective is to improve the overall sealing and strength of this hose coupling. As service requirements become more demanding, the need for higher pressure hoses has developed. Working pressure of up to 15,000 p.s.i. are now necessary. Also, tests such as the Lloyds of London Fire Test (700° C. [1294° F.] at a working pressure of either 10,000 or 15,000 p.s.i. for 30 minutes) have been established for hoses to be used on oil rigs in the North Sea. A new seal is needed that will meet these more demanding operating conditions. Also in conjunction with these tests and overall more demanding operating conditions, heat resistant ceramic fibers have heretofore been placed beneath the cover of the hose to protect the inner hose from exposure to high temperatures.

Couplings, such as the one disclosed in U.S. Pat. No. 4,143,892 to Murphy et al, may have a tendency to fail at sufficiently high pressure. The primary site of failure in couplings such as these has been found to be where the seal and coupling seal ring seat against the fitting. Therefore, an object of this invention is to provide a modified seal and coupling seal ring to increase the reliability of couplings of this design in high pressure service. Additional references that are relevant to this disclosure include U.S. Pat. Nos. 2,473,441 (Muller), 2,506,494 (Feler et al), 2,940,778 (Kaiser) and 3,217,282 (Chevalier et al).

SUMMARY OF THE INVENTION

In one aspect, the invention is drawn to an improved coupling including a coupling body sleeve having an inner bore of nonuniform dimension progressing to an enlarged zone near one end thereof; an improved connecting ring coupled to the sleeve within the inner bore and having, adjacent to the enlarged zone, a generally radially extending first shoulder, and having a first counterbore coaxial with the bore of the sleeve, and an abutment extending outwardly from said shoulder into the enlarged zone and providing a second counter bore of diameter greater than the diameter of the first counter bore, and the outer diameter of the shoulder being less than the inner diameter of the body sleeve; the abutment increasing the surface area of that portion of the coupling that is most susceptible to failure at high pressure, thereby distributing the pressure over a greater area and reducing the possibility of failure; an improved semicured chevron seal made of a flouroelastomeric material, which is less permeable as well as harder than other elastomeric material previously used in this service, such as neoprene, said seal being a separate ring bonded to the fluoroelastomeric tube, and an uncured donut seal made of fluoroelastomeric material sandwiched between the coupling seal ring and the chevron seal an epoxy resin being used to attach the seal to the ring. The improvement of the seal and tube lies in the use of a two-component carbon black filler of large and small particle sizes to make the seal less permeable to $H_2S$ while increasing its tolerance to pressures on the order of 15,000 p.s.i. or greater.

BRIEF DESCRIPTION OF THE DRAWINGS

The invention will be more particularly described as to its preferred embodiments by reference to the accompanying drawings, in which like numerals designate like parts, and in which:

FIG. 1 is a partial cutaway sectional view longitudinal through a hose and coupling embodying the invention;

FIG. 2 is a partial sectional view depicting the hose and coupling assembly during an intermediate processing stage.

PREFERRED EMBODIMENTS OF THE INVENTION

Figure 3:
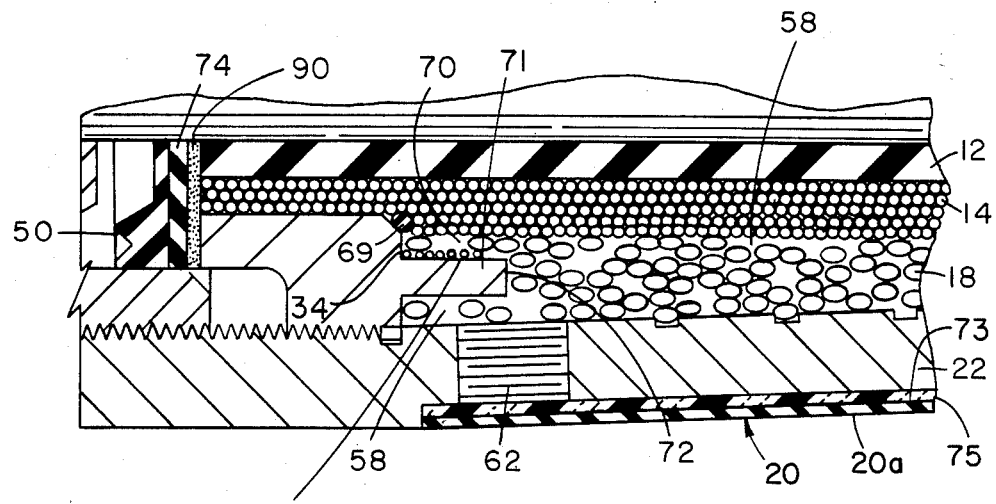
FIG. 3 is an enlarged sectional view in the area of the enlarged zone of the embedded reinforcements according to one embodiment of the invention.

Referring to FIG. 1, the hose portion of the assembly is shown generally at 10, and includes a fluoroelastomeric tube 12, multiple plies of carcass textile reinforcement 14 embedded in or adjacent to the tube, cover 20, in which is embedded multiple layers of a high temperature insulating material, such as ceramic fibers, and a sandwiched reinforcement section 16. The reinforcement section is composed of four or six plies of helically wound metal filaments 18, e.g. formed of monofilaments or cables, depending on the service for which the hose is constructed. If the working pressure is 10,000 p.s.i., then a hose with 6 plies of carcass reinforcement and 4 plies of wire filaments will be used. The 10,000 p.s.i. hose has been tested to 15,000 p.s.i., and has a burst pressure of 22,500 p.s.i. If the working pressure is 15,000 p.s.i., then a hose with 4 plies of carcass and 6 plies of wire filaments has been found suitable. The 15,000 p.s.i. hose has been tested to 22,500 p.s.i., and has a burst pressure of 33,750 p.s.i.

The coupling assembly generally includes outer coupling body sleeve 22, and co-threaded coupling seal ring 24 and end adapter 26.

The sleeve 22 has an inner bore 28 having a nonuniform bore dimension which progresses generally from a minimum dimension at the hose end 28' of the sleeve to an enlarged, preferably maximum bore dimension in the enlarged zone 28" near the fitting end 30 of the assembly. In the preferred embodiment shown, the inner bore of the sleeve tapers gradually toward the fitting end in frustro-conical fashion. Alternatively, the inner bore may stair-step, for instance, with the same overall progression of increasing diameter toward the fitting end of the assembly.

Modified coupling seal ring 24, which comprises a portion of the improvement in this embodiment, is threadedly engaged into the sleeve inner bore and positioned against stop 32. The ring has, adjacent the enlarged zone 28", a generally radially extending annular shoulder 34, and a counterbore 36 coaxial with the inner bore of the sleeve, defining a longitudinally extending surface 38. Extending outward from shoulder 34 is an abutment 71 defining a counterbore 70, which is coaxial with the inner bore of the sleeve. Counterbore 70 is larger in diameter than counterbore 36, but smaller in diameter than the sleeve 28 into which it extends. Alternatively, ring 24 may be integral with (i.e., one in the same) or otherwise cojoined to the sleeve 22 such as by welding or press fitting. The abutment 71 that forms counterbore 70 also defines the radially extending surface 72 and longitudinally extending surface 92.

The end adapter 26 may be the threaded nipple shown, adapted to couple other fittings via threads 44 or, alternatively, mated fittings could be butt welded together. The end adapter is also co-threaded into the fitting end of the sleeve 22, and has a second shoulder 46 and annular groove 48 which, together with the nipple 40 of the ring, form an end seal zone similar to that shown in the aforementioned U.S. Pat. No. 2,473,441. The shoulder 46 is spaced from nipple 40 to accommodate an annular, semicured, fluoroelastomeric chevron sealing ring 50, which is preferably a separate ring bonded or covulcanized to an uncured fluoroelastomeric donut seal 74, which in turn is bonded using a thin layer of epoxy 90 (shown enlarged) to the fluoroelastomeric tube 12 and carcass 14. An inward seal between the chamfered corner of ring 24 and carcass plies 14 is established with the aid of rubber ring 69. The end adapter 26 is provided with a through bore 47 of the approximate diameter of the tube of the coupled hose.

In use of the hose coupling assembly, adapter 26 is lockingly integrated with the rest of the assembly by the provision of one or more radially extending set screws 52 threaded into opening 54 and protruding into opening 56 formed in the adapter nipple.

As shown, the individual reinforcement filaments 18 are nonuniformly distributed within the frustro-conical annular volume determined by the spacing between the inner bore 28 and carcass layer 14. Whereas the filaments of the plies in the hose end 28' (shown approximately as zone A) are uniformly and preferably relatively closely spaced together (including touching), filaments 18 in the enlarged zone 28" together with those extending rearwardly toward the hose end adjacent zone A (all defined as zone "B"), are at least in substantial portion randomly distributed. By such random distribution is meant that while some of the wire filaments may actually be in mutual contact, the overall distribution of wires and spacing therebetween does not follow a specific or predetermined pattern. Many of the wire filaments may be relatively far apart, and in general the bulk of the wires are spaced substantially farther apart than the wire filaments in zone A. In one preferred embodiment, the spacing between filaments in zone B becomes progressively and gradually greater toward the fitting end of the coupling (enlarged zone 28").

At least a substantial portion of the wire filaments in the enlarged zone 28", within zone B, are embedded in an anchoring matrix 58 (shown unsectioned), which may be a thermosetting resin such as epoxy, with high compressive strength. This provides the frustro-conical wire anchoring matrix composite with resistance to blow-off of the coupling. It is most preferred that the anchoring matrix extend into zone A, particularly within the annulus 60 formed between the outer ply of reinforcement and the inner bore 28.

Inlet port 62 is provided for injection of the anchoring material. Any excess material will bleed out of inlet port 62. The anchoring matrix may also lodge in recesses formed along the inner hose surface, such as grooves 66 formed in the inner bore 28 for added holding power. Such grooves may be formed in any desirable configuration e.g., helical or annular, as shown.

In the embodiment of FIG. 1, the innermost ply of reinforcement 16a is uniformly closely spaced throughout zones A & B. The remaining three reinforcement plies, however, are randomly distributed in zone B in accordance with one element of the invention. The improvement to ring 24, the abutment 71 defining counterbore 70, provides an increased supporting surface area to ensure that the coupling will not fail at high pressure.

In the embodiment of FIG. 3, all four plies of reinforcement 16 (innermost ply at 16a in FIG. 2) are formed of wire filaments 18 or cable plies that are spaced apart in random manner and embedded in matrix 58, and which are spaced farther apart than the wire filaments positioned at the hose end of the coupling (not shown). As with the other embodiments of the invention, the random spacing is believed to offer the important advantage of minimizing the chance of blow-off of the coupling by eliminating shear planes (actually shear "cones" formed within the epoxy matrix between rows of the conventional uniformly radially spaced wire plies. By increasing the surface area of the coupling ring, the invention further reduces the possibility of wire filament failure at high pressure. The abutment 71 defined by surfaces 72 and 92 provides additional rigid support near the fitting end of the coupling, enabling the coupling to withstand greater internal hose pressure. The abutment coupled with cable plies anchored in an epoxy matrix provides better resistance to internal pressure than just cable plies anchored in an epoxy matrix.

The hose coupling assembly of FIG. 1 is manufactured according to the following method as illustrated in FIG. 2. Initially, an uncured hose preform including inner tube 12, carcass layers 14 and reinforcement 16 is built up on a pole mandrel 76 in conventional fashion. The wires may preferably be applied spirally, ply-upon-ply. The tube material may suitably be formed of fluoroelastomeric material, and the carcass plies 14 formed of a calendered fabric frictioned or skimmed with rubber, and which has been wrapped over the tube. Again, the abutment 71 defining counterbore 70 of ring 24 ensures increased surface area which reduces the pressure on the innermost wire filaments through the method described below.

As shown in FIG. 2, to produce the coupling and hose assembly of FIG. 1, the tube and carcass, and the plies of wire reinforcement 16 are offset such an amount that the tube and carcass are approximately coextensive with the fitting end of the counterbore 38 of ring 24, the innermost ply 16a of reinforcement substantially abuts against shoulder 34 and counterbore 70 of the coupling seal, and the remaining plies of reinforcement are spaced a substantial distance longitudinally from the shoulder abutment 34 and counterbore 70. This latter spacing (zone B) will be from about 25 to about 75 and more preferably from about 40 to about 60 percent of the length of the coupling body sleeve bore 28. To ensure that the individual wire filaments 18 do not prematurely spread apart, they are immobilized. As shown, this will be accomplished by using relatively fine binding wire 78, 80, 82, at the desired locations. In the embodiment of FIG. 2, this will be accomplished by separately binding down the stepped portion in the area of the enlarged zone of the first ply 16a, and also a separate binding down at 82 of the plies at the forward end (fitting end) of the wires in zone A. Each of these two bindings are intended to be permanent and will remain in the finished assembly.

In addition to the bindings at position 78 and 82, there is also established a temporary binding down of the three remaining plies in the area of zone B with multiple convolutions 80. In a preferred manner, the convolutions or helices 80 are begun adjacent the hose end 28' of the reinforcement plies, and spiralled through zone A at a fairly large pitch and then laid at a very close pitch as shown at 80 within zone B until the most forward convolution 81 is laid. At this point, the convolutions are laid in the opposite direction back toward the hose end of the reinforcement, terminating in end 80'.

After the layered and telescoped end of the hose preform is inserted into the coupling subassembly consisting of outer sleeve 22 and ring 24, so that the plies 16a abut substantially against shoulder 34 and surface 90, the outer three plies of wire in zone B are released by pulling out the binding wire end 80'. As the binding wire 80' is pulled out toward the hose end of the assembly, the convolutions of wire 80 are uncoiled layer-by-layer until the binding has been removed and the individual wires 18 are permitted to spread apart. The wires, due to their inherent spring and resilience, displace and spread apart toward the fitting end of the hose, being confined within the annular void 83 determined by the inner bore of sleeve 22, the first layer 16a of wire ply, and surface 92 of the connecting ring.

The actual pattern of distribution of the released and spread apart wires within the enlarged zone, will vary, although the particular pattern and spacing shown in FIG. 1 is representative.

After the wires have been fully released, the anchoring material, e.g., epoxy resin, is introduced into three to four ports (one shown) 62 in sufficient amount to embed at least a large portion of the spread apart wires in the anchoring matrix. Bleeding through ports 62 will indicate the approximate completion of the filling operation. Either before or after such epoxy filling operation is completed, nipple 26 is threaded into place as shown in FIG. 2, until the ring 50 makes compressive contact with connecting ring 24 and the fitting end of tube 12 and carcass 14. At this point, in conventional manner, a multiple layered cover 20 preferably containing ceramic fibers (schematically shown at 73) in one or more layers 75 may be applied to the outer reinforcements of the hose and also to cover a portion of the coupling body sleeve 22, a final outer rubber cover layer 20a applied over layer(s) 75, a heat shrinkable curing tape applied to the cover, and the entire assembly cured in an autoclave using appropriate temperature and pressure to cause the rubber portions of the assembly to be vulcanized to form a unitary body.

The foregoing method may also be performed by removing the ring abutment 24 after delivering the epoxy into the coupling annulus and curing it, but prior to curing or vulcanizing the entire assembly. If the latter alternative is taken, a different end seal will be used, as those skilled in the art will appreciate.

An example of the above disclosed hose and coupling is one manufactured for choke and kill service on an oil rig. This particular hose is designed to withstand pressures of 15,000 p.s.i., and has been tested to withstand pressures of up to 22,500 p.s.i. The hose has an inner diameter of 2.5 inches and an outer diameter of 5.7 inches. The coupling, with an overall length of 21.25 inches, has an outer diameter of 8.5 inches, and an inner diameter of 5.7 inches. Referring again to FIG. 1, the hose in this example has a tube 12 made of Fluorel, a registered trademark of Minnesota Mining and Manufacturing (3M). The semicured chevron seal 50, and the uncured donut seal 74 are also made of Fluorel ®. An epoxy is used to adhere the donut seal 74 to the tube 12 and coupling seal ring 74. The epoxy used in this example is known as 1838 B/A and is made by 3M. The seals 74 and 50, and the tube 12 were all made using a two component carbon black filler system consisting of large and small particle sizes. The larger particles used had an ASTM designation of N-990 and an $I_2$ absorption of 10 mg/g using ASTM method D-1510. The small particles used had an ASTM designation of N-110 and an $I_2$ absorption of 147 mg/g using ASTM method D-1510. The larger particles make the seals and tube less permeable, and most importantly, prevent $H_2S$ gas in concentrations of up to 20% from attacking the epoxy matrix in the coupling and the reinforcement materials in the hose. The smaller particles make the seal more rigid, and thereby increase the seals' pressure tolerance.

The wires 16 are a brass-plated steel cable made of wound steel wires having a diameter of 0.0276 inches, the cable itself having a diameter of 0.138 inches.

The coupling seal ring 24, in this example, has a first counterbore 36 with a 3.22 inch diameter, and a second counterbore 70 with a 3.92 inch diameter. The abutment 71 defined by surfaces 72 and 92 has an outer diameter of 5 inches.

It will be understood that a variety of modifications and variations may be employed without departing from the spirit and scope of the invention, as defined by the appended claims.

What is claimed is:

1. In combination, a reinforced hose and coupling assembly having temperature and pressure service capability with respective hose and fitting ends comprising:
   a coupling body sleeve having an inner bore of differing dimension progressing from a lesser dimension at the hose end of the assembly to an enlarged zone near the fitting end thereof;
   a ring portion coupled to the sleeve within the inner bore and having, adjacent the enlarged zone, an inwardly directed shoulder, and having a first counterbore coaxial with the sleeve and of lesser dimension than the enlarged zone of the inner bore, and outwardly from said shoulder an abutment forming a second counterbore coaxial with the sleeve and of greater dimension than said first counterbore, but of lesser dimension than the enlarged zone of the inner bore;

hose inner layer comprising a fluoroelastomeric tube and/or carcass axially disposed within the sleeve and positioned adjacent the first counterbore of the ring; and multiple plies of metal filaments constituting the principal strain-resisting reinforcing elements of the hose disposed between the hose inner layer and inner bore of the sleeve, the filaments of the plies in the hose end of the coupling being relatively closely and uniformly positioned, and at least a substantial portion of the filaments of the plies which extend in the enlarged zone being positioned farther apart than the filaments in the hose end of the coupling and being embedded in an anchoring matrix material, such filaments being free being mechanically clamped together in the enlarged zone, and a portion of the filaments embedded in the anchoring matrix being positioned adjacent and radially inwardly of the second counterbore.

2. The assembly of claim 1 wherein the inner bore of the sleeve is frustro-conical in shape, tapering from a minor dimension at the hose end to a major dimension near the fitting end.

3. The assembly of claim 1 wherein the hose inner layer comprises tube and carcass textile reinforcement positioned between the hose tube a filamentary reinforcement and which follows the first counter bore of the ring.

4. The assembly of claim 3 wherein additional plies of carcass reinforcement are positioned in the area of the enlarged zone bridging the shoulder of the ring to an innermost ply of the filamentary reinforcement.

5. The assembly of claim 1 wherein the filaments of the innermost reinforcement ply are uniformly and closely spaced together from the hose end to the shoulder of the ring.

6. The assembly of claim 1 wherein each of the plies in the enlarged zone have filaments randomly distributed and spaced farther apart than the filaments in the hose end of the coupling.

7. The assembly of claim 1 wherein an end adapter nipple is coupled to the outer sleeve and has an annular indentation adjacent a juxtaposed annular surface of the ring wherein a fluoroelastomeric bead attached to the hose inner layer is sandwiched between the annular indentation and the annular surface to form a seal.

8. The assembly of claim 7 wherein the fluorelastomeric bead is attached to the hose inner layer with an epoxy cement.

9. The assembly of claim: 7 wherein the fluoroelastomeric bead comprises a fluoroelastomeric chevron seal attached to a fluoroelastomeric donut seal, the chevron seal being in the annular indentation and the donut seal positioned against the annular surface.

10. The assembly of claim 7 wherein the fluoroelastomeric bead is comprised of a two-component carbon black filler system of large and small particle sizes, the large particles making the seal impermeable to $H_2S$ gas in concentrations of up to 20%, and the small particle size carbon black material enabling the seal to withstand pressures in excess of 15,000 pounds per square inch.

11. The assembly of claim 1 wherein the hose has an outermost layer formed of elastomer and there is at least one layer of a high temperature insulating material positioned under the outermost layer of the reinforced hose adjacent the coupling body sleeve.

12. The assembly of claim 11 wherein the high temperature insulating material is ceramic fibers.

13. The assembly of claim 1 having a minimum rated working pressure of 15,000 psi.

14. In combination, a reinforced hose and coupling assembly having high temperature and pressure service capability with respective hose and fitting ends comprising:

a coupling body sleeve having an inner bore of differing dimension progressing from a lesser dimension at the hose end of the assembly to an enlarged zone near the fitting end thereof;

a ring portion coupled to the sleeve within the inner bore and having, adjacent the enlarged zone, an inwardly directed shoulder, and having a counterbore coaxial with the sleeve and of lesser dimension than the enlarged zone of the inner bore;

hose inner layer comprising a fluoroelastomeric tube axially disposed within the sleeve and positioned adjacent the counterbore of the ring;

multiple plies of metal filaments disposed between the hose inner layer and inner bore of the sleeve, the filaments of the plies in the hose end of the coupling being relatively closely and uniformly positioned, and at least a substantial portion of the filaments of the plies which extend in the enlarged zone being positioned farther apart than the filaments in the hose end of the coupling and being embedded in an anchoring matrix material;

a fluoroelastomeric seal disposed between the ring portion and the hose end of the assembly; and at least one of the fluoroelastomeric tube and seal being compounded with a carbon black filler system comprised of first particles of a relatively small particle size and second particles of a relatively large particle size.

15. The assembly of claim 14 wherein the ring portion further comprises an abutment outwardly extending from the shoulder having a second counterbore coaxial with the sleeve and of greater dimension than the first counterbore, but of lesser dimension than the enlarged zone of the inner bore, and a portion of the filaments embedded in the anchoring matrix being positioned adjacent and radially inwardly of the second counterbore.

16. The assembly of claim 14 wherein the inner bore of the sleeve is frustro-conical in shape, tapering from a minor dimension to a major dimension near the fitting end.

17. The assembly of claim 14 wherein the hose inner layer comprises a tube and carcass textile reinforcement, said carcass reinforcement positioned between the tube and filamentary reinforcement and which follows the counter bore of the ring.

18. The assembly of claim 17 wherein additional plies of carcass reinforcement are positioned in the area of the enlarged zone bridging the shoulder of the ring to an innermost ply of the filamentary reinforcement.

19. The assembly of claim 14 wherein the filaments of the innermost reinforcement ply are uniformly and closely spaced together from the hose end to the shoulder of the ring.

20. The assembly of claim 14 wherein each of the plies in the enlarged zone have filaments randomly distributed and positioned farther apart than the filaments in the hose end of the coupling.

21. The assembly of claim 14 wherein an end adapter nipple is coupled to the outer sleeve and has an annular indentation adjacent a juxtaposed annular surface of the ring wherein a fluoroelastomeric bead attached to the hose inner layer is sandwiched between the annular indentation and the annular surface to form a seal.

22. The assembly of claim 21 wherein the fluorelastomeric bead is attached to the hose inner layer with an epoxy cement.

23. The assembly of claim 21 wherein the fluoroelastomeric bead has said carbon black filler system and comprises a fluoroelastomeric chevron seal attached to a fluoroelastomeric donut seal, the chevron seal being sealed in the annular indentation and the donut seal positioned against the annular surface.

24. The assembly of claim 14 wherein the filler system is employed in both the tube and seal and makes the tube and seal impermeable to $H_2S$ gas in concentrations of up to 20%.

25. The assembly of claim 14 wherein the first particles meet ASTM designation N-110 and the second particles meet ASTM designation N-990.

26. In combination, a reinforced hose and coupling assembly having a high temperature and pressure service capability and resistance to $H_2S$ permeation, comprising:

a hose portion including a hose inner layer comprising a fluoroelastomeric tube incorporating first carbon black particles of relatively small particle size meeting ASTM designation N-110, and second carbon black particles of relatively large particle size meeting ASTM designation N-990, a hose cover, and reinforcement positioned between the tube and cover formed of multiple plies of metal reinforcement; and a coupling portion including a sleeve and a ring portion, the hose portion being securely fastened in fluid tight sealing relation to the coupling portion to prevent blow off during service.

27. The assembly of claim 26 wherein the coupling is attached to an adapter nipple with a seal sandwiched between the ring portion and adapter nipple and bonded to the tube of the hose, the seal being formed of a fluoroelastomeric material employing first carbon black particles of relatively small particle size meeting ASTM designation N-110, and second carbon black particles of relatively large particle size meeting ASTM designation N-990.

28. The assembly of claim 26 in which at least a portion of the hose cover has dispersed therein ceramic fibers.

29. The assembly of claim 26 having a minimum rated working pressure of 15,000 psi.

* * * * *